US007612680B2

(12) United States Patent
Eubank et al.

(10) Patent No.: US 7,612,680 B2
(45) Date of Patent: Nov. 3, 2009

(54) FIRST AID INFORMATION FOR CELLULAR TELEPHONES AND ELECTRONIC DEVICES

(76) Inventors: John R. Eubank, 800 Prospect St. #1F, La Jolla, CA (US) 92037; Chee Fai Wai, 5532 Pacifica Dr., La Jolla, CA (US) 92037

( * ) Notice: Subject to any disclaimer, the term of this patent is extended or adjusted under 35 U.S.C. 154(b) by 199 days.

(21) Appl. No.: 11/541,696

(22) Filed: Oct. 3, 2006

(65) Prior Publication Data

US 2007/0102527 A1    May 10, 2007

Related U.S. Application Data

(60) Provisional application No. 60/752,958, filed on Dec. 23, 2005, provisional application No. 60/722,414, filed on Oct. 3, 2005.

(51) Int. Cl.
*G08B 23/00*   (2006.01)
*H04L 9/32*    (2006.01)
*H04M 9/00*    (2006.01)

(52) U.S. Cl. .................. 340/573.1; 340/539.12; 340/539.11; 340/539.21; 340/3.3; 455/411; 455/412.1; 379/433.1; 379/428.02; 379/37; 713/168; 705/59

(58) Field of Classification Search .............. 340/573.1
See application file for complete search history.

(56) References Cited

U.S. PATENT DOCUMENTS

| 6,574,484 | B1 * | 6/2003 | Carley .................... 455/521 |
| 6,647,267 | B1 * | 11/2003 | Britt et al. ............. 455/404.2 |
| 2002/0170954 | A1 * | 11/2002 | Zingher et al. ............ 235/375 |
| 2004/0266390 | A1 * | 12/2004 | Faucher et al. ......... 455/404.1 |
| 2005/0021995 | A1 | 1/2005 | Lal et al. |
| 2006/0077903 | A1 | 4/2006 | Hiltunen |
| 2006/0137694 | A1 | 6/2006 | Probert et al. |
| 2006/0142057 | A1 * | 6/2006 | Schuler et al. ......... 455/556.1 |

OTHER PUBLICATIONS

PCT/US2006/038477 International Preliminary Report on Patentability dated Apr. 2, 2009.
PCT Written Opinion dated Mar. 11, 2008, 5 pages.*
PCT Notification of Transmittal of The International Search Report and the Written Opinion of the International Searching Authority, or the Delcaration dated Mar. 11, 2008, 4 pages.*
Printout of www.textually.org/textually, dated as early as Sep. 12, 2005, 1 page.*
Printout of http://www.dynamocomputing.com/target/simpledemo.html dated as early as Sep. 12, 2005.*
Printout of http://www.instinct.co.nz/portfolio.html dated as early as Sep. 12, 2005.*

* cited by examiner

*Primary Examiner*—Donnie L Crosland
(74) *Attorney, Agent, or Firm*—Merek, Blackmon & Voorhees, LLC (57) ABSTRACT

A method and apparatus for providing storage and display of emergency data and other reference materials on a cellular telephone, electronic telephone, multimedia player or other electronic device. Emergency information, first aid procedures, spiritual guidance, and reference information is embedded or otherwise stored on an electronic device, for later retrieval. Storage on the electronic device prior to the time of needs ensures that the information will be available whether or not a communication signal is available to the user.

18 Claims, 2 Drawing Sheets

FIGURE 1.

EMERGENCY INFO MENU
CPR
*Bleeding*
Unconscious
Heat Injury
Head, Neck & Back
Hurricane, Tornado, Floods
Terrorism
... Etc.

WHAT TO LOOK FOR
(description)

WHAT TO DO
(description)

PREVENTION
(description)

FIRST AID INFORMATION FOR CELLULAR TELEPHONES AND ELECTRONIC DEVICES

RELATED APPLICATIONS

This application claims the benefit of U.S. Provisional Application 60/722,414, filed Oct. 3, 2005 and U.S. Provisional Application 60/752,958, filed Dec. 23, 2005, both of which are incorporated herein by reference.

BACKGROUND OF THE INVENTION

1. Field of the Invention

The present invention relates to the storage of emergency data and other reference materials on a cellular telephone, electronic telephone or other electronic device.

2. Description of the Prior Art

Cellular telephones ("cellphones") have become immensely popular during the last decade. It is very common to see a person of almost any age or generation publicly engaged in a conversation on a cellphone, using a walkie-talkie style cellphone, text messaging on a cellphone, surfing the internet on a cellphone, or even watching television on their cellphone. Because the cellphone is a staple commodity found on most people at most times of the day or night, the cellular telephone represents an ideal medium to provide emergency or helpful information which can readily be made available during crisis or crucial moment. Several attempts have been made to provide information to users about impeding emergencies such as approaching hurricanes or other weather alerts, traffic accident information or the like. However, no one has addressed the needs of users who find themselves having to address personal emergency situations around them, such as accidents, heart attacks, asthma attacks, snake bites, etc. What is needed is readily available emergency information to users on how to prepare for, solve, address, or deal with every day emergencies storable in a source that is already carried by or available to the user.

SUMMARY OF THE INVENTION

The present invention provides for the storage of first aid and emergency response information in a cellular telephone or personal assistant ("PDA") or other portable electronic device such as an iPod™, mp3 player or similar device such as the upcoming Microsoft Zune music/video player with wireless capability, especially any electronic device having audio, textual, or video playback capacity with permanent or temporary communication connection to a data source through cables, telephone lines, the internet or other networks. Having readily available information can be especially valuable to little league coaches, lifeguards, teachers, as well as those with little training in first aid.

The information is preferably stored in a telephone, though one skilled in the art will appreciate that other communication device as described above could be used, and is accessed by selecting a menu item from the cellphone. Information can preferably accessed by subject matter, symptom, or other topic. Information may be selected by keystroke, touch screen, voice activate menu or similar methods. All or parts of the information may be conditionally available to the user, providing high risk or highly technical procedures (e.g., tracheotomy) such as only after completing a prior step, or if a network is not available or by other rule or condition. Since the information is stored directly into the telephone, the information can be retrieved whether or not a signal is available, and in such a timely fashion as to be usable in real time by the user. Since the information comes from a verified source, the user is more likely to use and trust the information than from an unverifiable source.

Accordingly, it is a principal object of the invention to provide first and emergency information on a telephone or other portable electronic device having communication or download capability.

It is another object of the invention to store information permanently on a cellular telephone so that it can be readily retrieved by a user, without having to link to a cell tower or other remote location to download information during an emergency.

It is another object of the invention to provide conditional access to portions of the information, such as after completing a prior step or when external assistance is not available ("last recourse help") such as being unable to call a doctor because no network is available.

It is a further object of the invention to provide menu selectable information on first aid or other emergency survival skills that can be used by a user in an emergency, regardless of whether the user is receiving a signal or not from the service provider (e.g., "phone company").

Still another object of the invention is to provide information embedded in a cell phone that can readily retrieved for use by a user without having to connect to an external source or search the internet for information, thereby saving valuable time in an emergency or time sensitive situation.

It is another object of the invention to provide a portable electronic device with lifesaving, emergency, first aid or spiritual information in audio, textual or video format readily accessible in an emergency or when needed.

It is yet another object of the invention to provide customizable information to a user based on geographic, service industry-related, or other group specific information that can be preinstalled on the electronic device, or can supplement or replace information stored on the device.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT(S)

The present invention is to a system and method of providing emergency information and/or first aid information to a user in a readily accessible form.

The government has long recognized the importance of distributing standard, basic information to its citizens. The channels of distribution have been problematic and have always relied on piggybacking on commercial distribution channels to reach the highest number of citizens. One example is the emergency broadcast system which interrupts on-air stations with a broadcast and replaces the broadcast with the government's desired information, such as warnings of impending tornadoes or other emergency information. The government also uses public and private venues for mandated display of public information to attempt to provide information to a large number of people. These public displays of information include for example posters showing restaurant employees how to wash their hands after breaks, showing public school patrons how to perform CPR, or showing others how to perform a Heimlich maneuver.

While these displays may reach a large number of people and do attempt to display the information in a place most likely to find a need for the information, the displays do not provide timely information to the user unless he happens to be in the place where the information is posted. By contrast, most people currently carry an electronic device such as a cellular telephone or portable media device (e.g., mp3 player, etc.) with them at all times of the day and night. The telephones now have significant LCD displays and memory sufficient to run the telephone operating system, hold large telephone directories, multimedia files and/or games. More recent versions of telephone also have the ability to download customizable ring tones, games, text or multimedia messages, and even have combined MP3 players, cameras, video recorders, virtual video fee players into the cell phone. Even later models have combined the ability of the telephone to receive and transmit information over subsidiary channels such as alternate data channels, wireless connections, blue tooth communications, infra red signals, etc.

The telephone thus represents an ideal device for storing information which could be critical in a time of emergency, because of its nearly ubiquitous access at almost any time of night or day by most people. By providing first aid care or procedure information; emergency preparedness, analysis and response information; health information; or spiritual calming information preferably embedded permanently ("read only memory") in the telephone, users can recall the information in a timely fashion at the location where the information is most needed. Read only memory as used herein is defined as a portion of memory that is programmed by a manufacturer of the equipment or a service provider for the equipment and which is not designed for alteration by the user, or a portion of memory that is unchangeable by user of the electronic device in the normal course of use of the device.

More importantly, because the information is electronic and stored in a device which most people already carry, there is no extra burden (e.g., weight) to the user and the user does not have to remember additional hardware or devices to carry to have the information available to him. The information can be readily displayed on the screen or, in the case of a handicapped-access device, broadcast through the telephone speaker. The information may be textual, audio or video or a combination thereof. And since the information is preferably stored on the telephone before the user receives the telephone (e.g., OEM), there is no requirement that the user be currently logged onto a telephone network ("service provider network") to access the information, nor is there a requirement that the user surf the web trying to locate information when time is limited or which connections are unavailable (i.e., no wireless service available).

Figure 1:
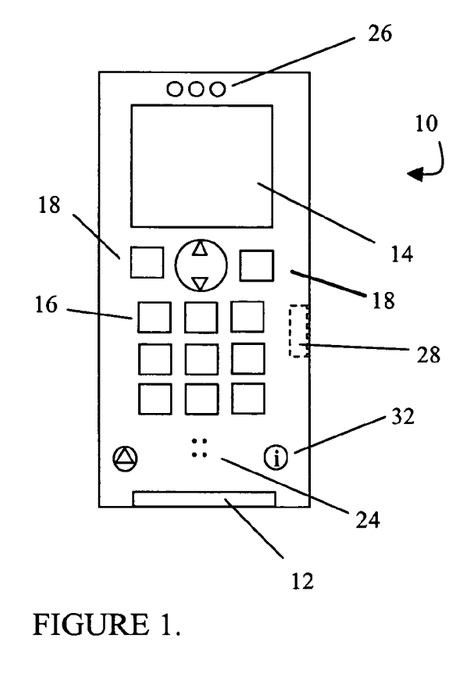
FIG. 1 is a diagrammatic view of a cellular telephone handset according to a preferred embodiment of the present invention.

An electronic telephone 10 capable of being used for such dissemination of information is shown in FIG. 1 according to a preferred embodiment of the invention. An electronic device, preferably a telephone, has programming that is loaded into the telephone by the manufacturer which includes the telephone operating system ("BIOS," etc.) and which may including applications such as menuing systems, calendars, telephone directory interface, and connecting information sufficient to connect and communicate with a wireless telephone network, such as CINGULAR, VERIZON or the like. However, one skilled in the art would recognize that the telephone could instead be a portable telephone ("non-cellular") having a display or memory that is connected to a nearby base unit, or any other POTS or VOIP telephone.

The telephone 10 is provided with a memory device such as a memory chip 12 or a removable disk drive, flash drive, micro CD drive, a SIMM card, but which is preferably a chip permanent embedded within the telephone. In a most preferred embodiment, the memory chip 12 also contains the main BIOS (e.g., operating system) of the telephone. This could be in ROM, flash memory, hard drive or similar memory device.

Preferably, a program according to the present invention is loaded onto the memory chip 12 at the manufacture, before delivery to the customer. The program contains in part the first aid and emergency response information ("FAER"). The program may include means for displaying the emergency information, but alternative or supplemental external languages, browsers or programming may be used to display the information, such as BREW, JAVA, EXPLORER, WINDOWS MOBILE, ROUNDPOINT, etc. to reduce the amount of programming required to deliver such information to the user. In other words, the FAER program stored on the electronic device may be self-sufficient or may be programmed or formatted to work with an external program or with a browser or other display programming of the electronic device. For instance, html formatting may be used to display the FAER information on a compatible browser.

Figure 3:
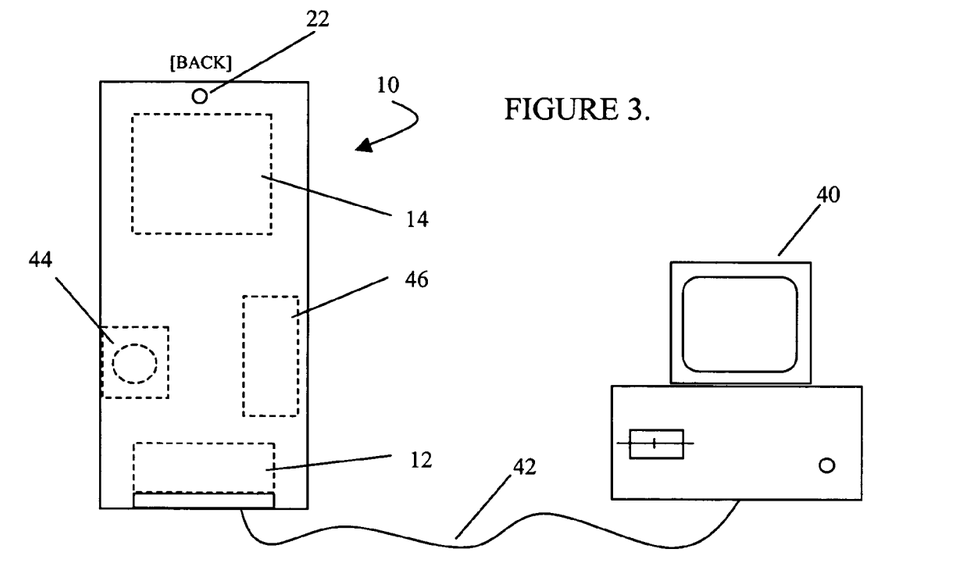
FIG. 3 is a diagrammatic view of the back side of the cellular telephone according to a preferred embodiment of the invention.

The FAER information is preferably static, that is, it is well researched information on topics such as "how to detect a pulse of an unconscious person" and other first aid and emergency response information that does not change and does not need updating. However, a portion or all of the information could be updated or supplemented by the manufacture, by the service provider, or by the user. The updating could occur by automatically or can be by manually initiated downloading of information over the wireless (telephone) service or by plugging the telephone (10, FIG. 3) into a computer 40 (e.g., a computer connected to a data source or the internet) via a cable 42, or by replacing or adding a memory device 44 to the telephone. Preferably the updated information is stored in semi-permanent memory 44, 46 such as a hard drive, replaceable flash memory, micro CD, non-volatile RAM, etc., and is displayed in addition to or in place of portions of the ROM based information that it replaces. In this way, a minimal amount of user-available storage is taken up by the updated information.

However, it is envisioned that the majority of the information necessary to respond to first aid or other emergency will be contained in read only memory ("ROM") in the telephone that is provided before the user takes delivery of the telephone. The information could be added to the electronic device 10 at the manufacturer ("O.E.M."), at the service provider level (e.g., prior to activating the end user's subscription or prior to activating the subscriber), or at the store when such equipment is purchased. The provision of the information could include the step of "unlocking" the information by any of these parties or later by the user by paying a fee, entering a code, agreeing to a license or an electronic "shrink wrap" license, registering with a website, etc., or a combination of these steps. It is also envisioned that the ROM contained program interfaces with additional information that can be updated as will be discussed further below.

The telephone has a main display screen 14 and a keypad 16 which may include numeric keys and function keys. The phone may also have a number of "soft" keys that can be programmed (or reprogrammed) to have different functions depending on the display label ("context sensitive"). In other words, the display may show a label associated with the soft keys 18 that instruct the user what function is assigned to the key, such as "answer," "exit," "end," "back," etc. The function of the key may be dependent on previous keys depressed or on the current display of the telephone, as is well known to those skilled in the art. The telephone may be provided with a camera lens 22 that records still pictures or video, or may other inputs for information. The telephone may also be provided with a microphone 24 and a speaker 26 as is well know for providing two-way voice communication and for other audio input and output functions.

The main operating system of the electronic device preferably either includes or runs program applications such as the menuing system of the telephone. The menu preferably allows the user to enter selections from a menu directory using buttons, virtual buttons, or by a voice activated interpreter. The directory items, when such electronic device is a cellular phone, may include a calendar, games, a calculator, set up selections, etc. as are well known in the art. The menuing system is herein provided by way of example only, and is not material to the operation of the present invention. In a preferred embodiment of the invention, the present invention provides an additional selection to the menu, preferably as a top-level menu selection. However, the selection of the information may be by other means than by an additional menu item, such as by a dedicated key or by a key combination or voice activation as will be discussed further below. Selection of the menu item causes first aid and emergency response (FAER) Information to be displayed on the telephone display or to be otherwise broadcast by the telephone. This broadcast could include playing the information over the speaker using a voice simulator, especially for deaf or otherwise handicapped or disabled users.

Figure 2:
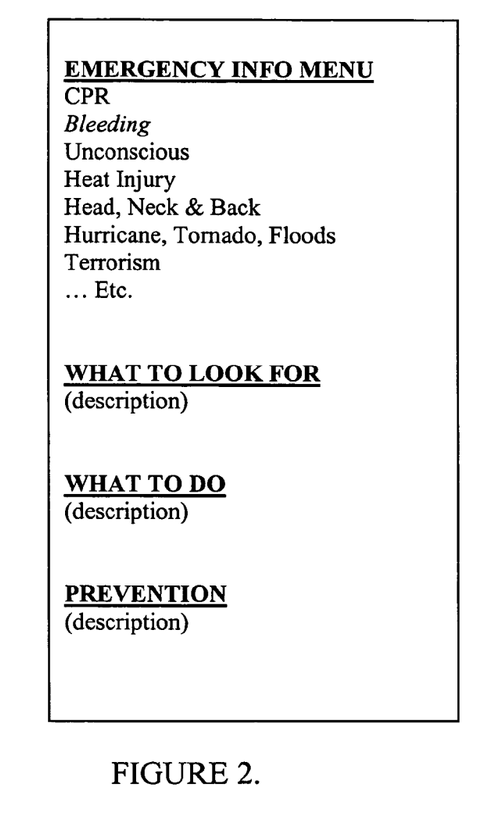
FIG. 2 is diagrammatic view of a menu system for a cellular telephone according to the preferred embodiment of the present invention.

As shown in FIG. 2, the FAER information can take the form of a further menu arranged by topic or by symptom. Each topic or symptom can have a sub-menu below it. For speed and efficiency, it is preferable to provide few enough menu items at each level that the user does not have to scroll down to further items not displayed on the display, but can select only from the menu items shown in one display. The menus may be textual or graphical, including a display of a human or body parts such as arms, heart, legs, etc., for rapidly allowing the user to "zoom in" on the area of information needed. The graphic may also refer to a particular emergency such as a asked permission from the patient or confirm that the patient is not capable of giving permission prior to administering help. Additionally, advanced procedures may require that the user try less intrusive methods prior to viewing instructions on how to perform the more intrusive options. For example, a user may be required to attest that he has tilted the patients head back and tried to clear an airway prior to viewing instructions on performing a tracheotomy. The step of calling for help or attempting to call for help may be required prior to performing a step. Certain help or all of the help may be unavailable to a user if a network is available or a 911 call may be made. While much of the help may be of low risk to the patient, such as elevating the legs of a patient or checking for a pulse, it may be that many items of the information are to be used as an avenue of last resort in the absence of any other information. For example a patient that is not breathing must be helped immediately, and it may be that doing the wrong thing may be no worse than inaction. However, if time is important but not critical, such as a broken bone or moderate bleeding, it may be better for the user to attempt a telephone call several times before giving up on seeking professional help and attempting to solve the problem on his own with the use of the provided information. It is of course not possible for a limited number of text or multimedia presentations to be a substitute for professional medical help. However, many simple precautions, preventatives and preliminary steps may be quickly and easily performed to increase a patient's chances of a quick and successful recovery that may be instructed to the user in an emergency situation. Additionally, a user, even one that has completed many emergency preparation classes such as CPR and first aide, will likely have a much more calm and even response when his learned information is confirmed, allowing him the confidence to proceed in the recommended method without having to second guess himself.

To ensure that the user has the most up to date information and is qualified to have access to the information contained in the electronic device, it may also be required prior to the initial use of the telephone, prior to use of the FAER information or prior to accessing some of the FAER information that the user agree to certain licenses (e.g., "electronic shrink wrap license") or waivers in order to use the information. Additional steps or requiring completion of sequential steps in sequence may be required before access to all of the stored information to ensure that proper procedures are followed by the user and to reduce the risk to the patient. Alternatively, access to the FAER information may be provided that bypasses other security measures of the cell phone For instance, holding down the 9 button or using a voice activated menu may unlock the keyboard that was otherwise locked, for the purpose of allowing the user access to the FAER information. This has the dual purpose of allowing the user to access emergency information on the cell phone of an unconscious or panicking patient, and allows speedy access to a user who may not be able to remember his access number in an emergency situation.

It is important that the information remains simple and accessible. If the information is not accessible quickly, the user will abandon the search for information in favor of figuring it out on his own. For the same reason, it is important that the information be readily available at all times, and for the most-likely encountered situations, not requiring the user to connect to the wireless network to retrieve the information. Many emergencies occur in remote locations such as hiking trails, biking trails or camping areas. It is often difficult, if not impossible, to connect to a wireless flame, gun, tornado, person, etc. to represent the particular emergency. As shown in FIG. 2, representative topics are shown, and a user selecting "hurricane, tornado, or flood" information would be provided a further menu to select from "hurricane," "tornado," or "flood" if appropriate, before viewing information on how to respond to a hurricane, tornado or flood.

Preferably many of the items are symptom based, instead of topic base, as most users will be unfamiliar with medical emergencies and will only be able to diagnose the symptoms and not the cause or real location of the trauma. Using tree based logic, for example, a user can quickly determine the cause of a trauma and/or the best way to prevent or treat the victim. The information can be presented textually, graphically, or can be auditory.

For instance, in an emergency a user coming across an unconscious victim, will scroll to "unconscious" to find out what to do with an unconscious person or will say "unconscious" in the case of a voice activated menu or will select the appropriate graphic. Selection of "unconscious" will either lead to immediate information on how to diagnose the patient/trauma, how to treat the victim, or how to prevent further injury or trauma. The selection could also result in further selections based on further symptoms either before or after the diagnosis above, such as "no heartbeat found" would lead to CPR information or "obvious head injury" could lead to information or cautions about not moving the patient because of potential neck injury. Preferably, additional cautionary information on what not to do or what precautions to take is also displayed simultaneous to or before or after the treatment information. Any item may also be locked, requiring that the user complete certain steps or analytical steps prior to retrieving the information. For instance, the user may have to attest that he has network provider ("active network connection") in such remote areas. By Murphy's law that whatever goes wrong will go wrong, it will often happen that even where connection and signal strength is usually sufficient, an accident in a garage or an apartment building will find the user without cellular service or with limited service, and only a user with preloaded medical and emergency response information will have the ability to access the FAER information.

Additional information could be included beyond first aid. Responses to terrorist events, mugging, robbery, physical abuse prevention, substance abuse prevention, steroid prevention, suspicious activity reporting, etc. could be included by providing things to watch for, how to avoid potential trouble, who to contact in an emergency or where to send information.

Information specific to a particular area or to a particular group could be provided to the electronic device as ROM programming or downloadable to supplement the main information. For instance, geographic specific information could be provided selectively or automatically to the telephone. A user in the South could be provided automatically with hurricane specific information, whereas a user in the Midwest could be provided with tornado information and a user in the North could be provided with frostbite information to supplement the main FAER information.

Information could also be selectively prepackaged for groups of industry or occupation specific users, such as youth sport coaches, babysitters, emergency service personnel, homeland security officers, militia, restaurant workers, medical personnel, policemen, firemen, boy scout leaders, snow patrol, etc.) Grouped topical information could also be available on a website for selection by users to supplement automatically or previously provided information, such as a hiker may want to download information pertaining to water safety prior to a hike along a river basin. The provision of information to the cell phone may include downloading management tools such as alerting the user to the amount of space required for such downloaded information or warnings that further downloading will exceed memory capacity.

Downloading may also occur automatically by remote $3^{rd}$ party control or according to pre-approved policies such as automatically downloading ANTHRAX treatment or readiness information when government agencies release an ANTHRAX warning generally or for a specific group or persons or a geographic area. Information could change seasonally or with the location of the user or based on other characteristic of the user based on current deployment or historical data and predictions from that data. For instance, if the user (or a member of a grouping that the user belongs to) arrives in Miami and has on each arrival to Miami requested SCUBA related medical information, downloading of such information to the user's cell phone could occur without request based on historical requirements.

Ready access to the information can be provided by providing an additional menu to a menu of the cellphone. Hot keys can also be provided or programmed into the phone. Dialing 9-1-1 (e.g., without hitting the send key or if the send key is depressed, but no connection to a 911 center can be achieved) can be used to bring up the FAER information, or holding one key down for 3 seconds, such as the 9 key could disengage any key lock and bring up the menu. Additionally an automated voice activated menu may be used to initiate the FAER display, such as saying "help," "first aid," or "emergency" into the cellphone from any point may initiate the system. In other embodiments, soft keys or programmed function keys could be provided to display the menu. As shown in FIG. 1, an information key (i) 32 can be provided to bring up the menu when pressed.

By providing information that is preferably preloaded and static, the information is both readily accessible and more reliable. Downloading information from a website can be convenient and can provide the same information as that preloaded into a telephone. However, the internet still in its infancy is full of valuable information and full of well meaning, but incorrect information as well as full of false information. By providing the information at the manufacturer or service provider level, the information does not need to be verified. The information will be presumed accurate and usable, and will thus carry a higher weight with the user who will be likely to accept information from the original source. Information from a website can be incomplete and unreliable and the user would have to take this into consideration when using the information, especially where the information was counter to the user's intuition or to memory of previous instruction.

In a preferred embodiment, the FAER information is static information stored within the telephone that interfaces with variable or downloadable information. The variable information could include user programmable information as well. By storing fire, police and rescue phone numbers in appropriate registers (not shown), the numbers could be used as variables accessible in the menuing system. For instance when reviewing the CPR information, a soft key 18 could be programmed to dial for an ambulance by dialing the appropriate EMT or rescue telephone number. In this way, the emergency information could still be displayed on the telephone while emergency crew are summoned, saving valuable time.

In an optional embodiment which may be used with the preferred embodiment, information can also be provided to the emergency crew by other inputs from the cellular phone. Most importantly, the camera ready cell phones may be programmed to take a picture when commanded by the instructions of the FAER display. It is preferred that a soft key 18 is labeled "photo" at the appropriate time and pressing such a button causes the camera to take a picture. The picture can be uploaded to an emergency crew connected at the time by the cell phone (or audio and/or video) or stored for later upload or display to the crew. This is especially convenient when suspicious activity such as potential terrorist activity is being recorded. As photo resolution on cell phones is increased to 5 megapixels or beyond, the ability to transmit high quality relevant information to the police, FBI or similar law enforcement agency could become important in stopping potential terrorist threats. In a preferred embodiment of the invention, the camera could be place on video or monitor mode to show real time or delayed motion video of a scene taking place that requires remote or later review. In this way, the cellphone could act as a remote sensor for the police, for a doctor or other agent to give real time feedback (e.g., on diagnosing a patient) or for gathering evidence (e.g., of a crime or terrorist event). In a further preferred embodiment, the user can give control of the camera and microphone on the phone to zoom, direct the lens in a particular direction or otherwise control the telephone to maximize sensing of the environment of interest to the remote user. As more sensors and capabilities are added to cell phones, more information can be transmitted to the agents. However, the use of sending information to the remote party is not required to achieve effective results to the user by just providing information on first aid and emergency response to the user based on stored information.

A further feature of the telephone of the telephone system is envisioned as Global Positioning Systems ("GPS") become further incorporated into cellular and electronic telephones. A telephone equipped with a camera and a GPS feature 28 can be used to document an accident (e.g., broken leg), incident (e.g., car accident) or event (e.g., bank robbery). In a most preferred system, accessing the FAER system includes an option to take record the situation by taking a photograph. Preferably the recorded image is accompanied by additional recorded information about the event, including time, date, location from the GPS, direction (e.g., East, West, 14 degrees from North, etc.). Through the use of the GPS system, additional information could be attached, downloaded, appended, or accessed, including the name, address, location, directions to and/or telephone number of the nearest emergency facility, rescue center, hospital, law enforcement agency, etc. Additionally, information such as traffic conditions, weather conditions, could be downloaded using the GPS location and time to access internet databases to provide background information to later investigators. As Bluetooth and other local wireless links become more prevalent, information from other related devices nearby could also be attached to the image file or stored in a related file, including automobile "black box" information, traffic signal information, or information from other compatible devices at the work place or other location of the accident which would help later investigators understand the circumstances of the accident. The telephone in a further preferred embodiment, could poll other local telephones to determine what other devices are in the area to preserve a potential witness list of near bystanders, video sources, or other identifiable devices or persons associated with these devices. In a further embodiment, the telephone can send a signal to alert other nearby devices that an event of interest has occurred either requesting the other devices for assistance or causing an action in such devices to take an action. This action could be as simple as requesting a store video monitor to save video at the time of a work place accident or sending a remote alert through a home security system to notify emergency personnel of the event. The action could also be the automatic uploading of the picture and/or related stored information surrounding information to emergency personnel or a third party such as a local storage device or local security system or insurance agent to preserve the evidence in case of later destruction or loss of the telephone. The action could also entail sending a signal to a related telephone, such as that of a parent, supervisor or coworker previously programmed for emergency summoning or selected based on the location of the user.

Typically, current cellular telephones can automatically download the local time or receive a synchronization signal or other signal such that the time on the telephone is correct. In the most preferred system, the time and location are those not controlled by the user, such as by recording the system wide time instead of the user's edited or entered time. The location is likewise determined by the GPS system or by local cell tower triangulation or a combination of these devices to add accuracy and reliability to the information. Additionally, the photograph and information can be digitally signed or otherwise made uneditable by the user. In this way the photograph and accompanying information will be reliable and usable as evidence of the accident or event. If the user could edit the picture, time or location, the probative value of the documentation will be greatly lessened.

After the photograph is taken, the FAER preferably provides the user with options such as taking additional pictures, releasing, deleting or storing the photograph, etc. Once the picture has been taken or saved, however, the FAER more preferably flashes immediately to a selection to assist the user in resolving the emergency such as flashing first aid information. Preferably an option will also be provided to display the location, directions or contact information for an appropriate emergency assistance provider or a selection or providers. For instance, the user could select from police, ambulance or fire services to bring up information on the appropriate services required. The information could be downloaded by comparison with a database correlated with the user's present location or could be stored in registers in the phone or selected from a list based on user inputs. Preferably the user's GPS location will control or reduce the listing to those within a certain distance from the user's current location to provide the most up to date information with the least effort available. In a further preferred embodiment, the photograph and location information are sent to a third party such as a security personnel who are able to summon the appropriate response team based on the photograph and location of the user. Additionally the display on the user's telephone could be controlled by the third party such as receiving the address of one or more hospitals, for instance, available to the user or requests for further information such as whether the user needs an ambulance or to be contacted by a doctor or just to send notice that the user will be appearing at the hospital and for his doctor to meet him there. By sending preprogrammed or enterable menus or selections from the third party, the pre-stored first aid information can be enhanced by real time inputs. Additionally, the third party could send or request information by instant messaging, text messaging, short messaging systems, or by voice response over the telephone depending on the urgency and complexity of information required to be transmitted.

In a further embodiment, the FAER information may be added to a cellphone or other electronic device, into non-ROM memory for electronic devices that do not have pre-loaded ("embedded") FAER information. The information may be downloaded from a service provider (e.g., CINGULAR™) or from the internet from a trusted site. The information may be stored to the cellphone in place of, in lieu of, or in addition to ROM information. Currently users that have cell phones, PDAs, iPods, ZUNEs or other electronic devices may desire to have first aid and emergency information available to them. The information may be selectable from a website and downloadable to their electronic devices, such as a cell phone. The data may be in form of a program or textual data or audio or video or a combination thereof. The information may be compatible with a JAVA or BREW program or may be displayed using a program such as that provided by ROUNDPOINT. The information may be also displayable on a browser contained on the cell phone, such as MICROSOFT MOBILE. The information may be stored temporarily in volatile RAM or may be stored longer term in non-volatile RAM or other memory devices. The information may be added to the electronic device by replaceable memory such as a flash drive or micro CD. The information may take the form of audio played selectively or automatically over the external speaker of the cell phone for younger users, blind users or for hands-free purposes. The information may be stored in a SIMM card or may be stored on a removable drive or disk. The information may include some information stored on the cell phone with further, additional, supplemental, or more specific information or guidance available through links provided to other internal (e.g., in memory or in removable disks of the telephone) or external (e.g., over the internet or other network or data channel) locations. For instance, internal memories on the telephone may contain basic information on how to treat snake bites with a link (e.g., hyperlink or soft menu button or graphic touch screen or voice activated menu) to a website of downloadable pictures of poisonous snakes that would be too cumbersome to contain on the telephone. Alternatively, the basic information could be provided on the memory of the cell phone, with additional information provided on removable memories of the cell phone such as CDs or flash memory or the like. As electronic devices receive more memory upgrades or include MP3 players, etc., it may be possible to link to a MP3 or MPEG that may be selectively, alternatively or automatically played with further information such as a demonstration of the treatment to be applied.

Figure 4:
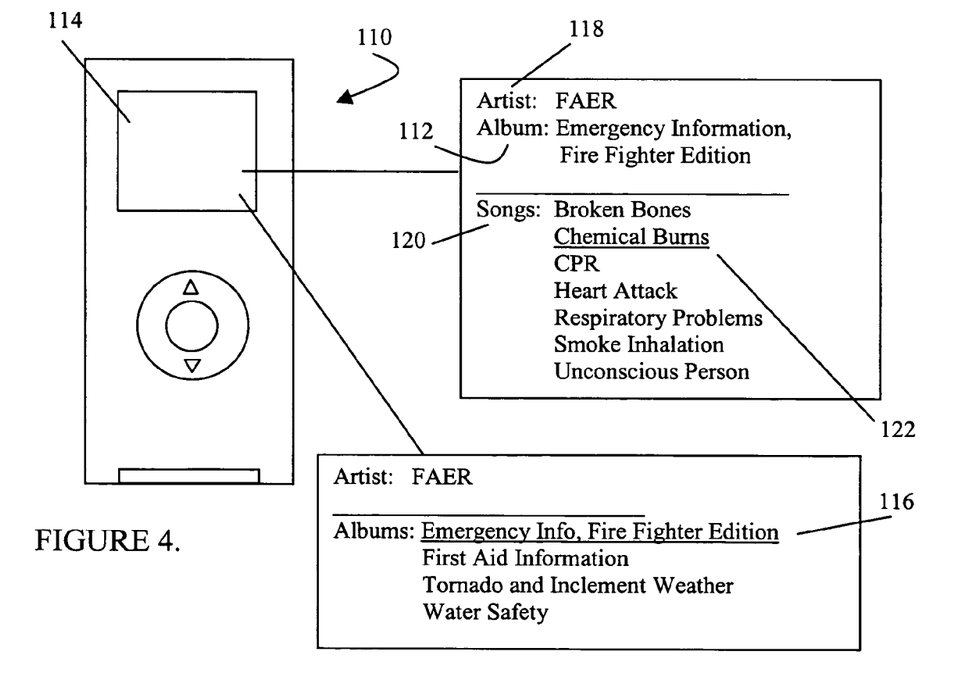
FIG. 4 is a diagrammatic view of a multimedia player according to a further embodiment of the invention.

Additionally, as shown in a further embodiment in FIG. 4, complete repertoires of emergency information and first aid care can be stored as "albums" on an MP3 player 110 such as an iPod or ZUNE such that the user selects "FAER" as the "artist" to see a list of "Emergency Information" titles 116 listed as the albums associated with the artist to be displayed on the display 114. The names of each "song" or "video" or recording 120 could be the title of the subject desired by the user. Thus selecting "Chemical Burn" 122 would play an audio or video about the desired subject, or display the equivalent of text on the screen. Alternatively, the "album name" could be the subject and the "song title" could be the emergency information, if the text field for the variables was long enough to display the information. And as a further alternative, a combination of the two methods could be used such as having basic information embedded in a cell phone and downloading or installing "albums" of additional information to the cellphone. The additional information could be played as described above or selectable from locations within the embedded information displays, such as by context sensitive hyperlinks or soft menu buttons, e.g., on selection of "more information" for a particular topic.

The information to be displayed may be stored in ROM, BIOS, or other memory in the portable media player analogous to the cell phone. Since each media player has the capability to have wireless or wired access to a data provider, the "albums" or grouped FAER information could be downloaded ("PODCAST") from a disk, from the internet or other network, or from a provider such as iTunes for later use. The information could also be provided in advance of purchase of the device in rewritable or read-only memory to the multimedia player or other electronic device. As electronic devices continue to merge (e.g., cell phones, media players, and digital cameras), the distinctions between the different classes of devices will continue to merge. Any device provided with memory and the capability to be loaded with data or that can communicate with a data provider for later or concurrent playing or replaying of data in textual, audio and/or video format can potentially be used to display the FAER information whether the device is classified as a cell phone, electronic phone, VOIP phone, POTS phone, PSTN phone, PBX phone, media player, PDA, gaming device such as a GAMEBOY, portable computer, BLACKBERRY, PALM PILOT, GPS display, laptop computer, automobile center console or GPS, etc. Preferably the information is provided in permanent ROM memory as part of the device, but may be included as ROM from external or internal sources, or supplemented or replaced with RAM based memory, or alternatively provided by volatile RAM or other shorter term memory that may or may not survive turning off the device.

In a further embodiment, additional information could also be provided to the user such as spiritual information. For instance, bible passages, calming verses, or other similar information could be provided to supplement the FAER information. In a time of crisis, people often find that religious or spiritual guidance can do as much to sooth a patient or a bystander as medical attention. By providing bible passages or information germane to the particular religious or philosophical needs of a user on a phone in advance or at the time of emergency, the information could be provide to heal the soul of the user simultaneous to or supplemental to or in lieu of medical help. This may be particularly critical in a mortal or fatal wounding of a person that is beyond medical help. Spiritual passages readable or playable from the electronic device to sooth the person through his last moments or to aid others who are close to the person may be provided under such topics as "verses" or "spiritual healing" or as another appropriate category or reachable by a soft button menu selection or other link. One skilled in the art would appreciate that the example of biblical passages could easily be replaced with analogous information based on the various religious preferences of various users or with non-denominational, agnostic information or poems or readings for the same purpose. The spiritual information could be packaged with the FAER information or separately provided.

In a further embodiment, for telephones that have severe memory restrictions, the selections on the telephone could be limited to the subject matter titles, and selecting the titles could initiate recording playback from a remote source over the telephone network, that is, a link through the internet, over the phone lines, or over another network could initiate the playback from a remote memory that plays back as an audio playback received at the cell phone of the user as a regular voice call. Additionally automated voice prompts could be used to supplement menu choices or in place of menu choices to start play back of audio recordings, text displays and/or videos over the cellphone of the user from the remote source. However, due to current network and wireless speeds, it is envisioned that prior stored messages on the device of the user are preferred.

In a further embodiment, a website or third party service is available to manage the data sent to or contained on a particular electronic device or groups of devices (e.g., all the cell phones owned by a particular company or belonging to a particular group). In the website example, a user would register his device on a website and would provide information to the website to register interests or requirements to match the user with pre-packaged or individually tailored or automatically configured for the user. For instance, in the various groups listed above, a youth sports coach may indicate that he lives in Kansas (or this or other information may be automatically garnered by the system based on GPS, IP address, nearest cell tower or by other means), that he is Christian, that there is a chemical manufacturing plant near by (i.e., potential chemical burns concerns), and that there is a particular concern with diabetes and epilepsy with this particular year's students. Information on all of the areas of interested (e.g., sports injuries, chemical burns, tornadoes, biblical passages) could be provided to the user's cell phone (or to his entire staff) automatically in addition to any automatically selected categories (school intruder, hostage, lockdown, teen specific information, etc.). If memory is a concern, the website may indicate prior to downloading the particular suggested areas and require or suggest that the user select on some of the categories for download. The download manager may indicate the amount of memory required for each area and indicate total download capacity and total download required for the selected areas to help the user manage which files are downloaded within the available memory. The download manager could present such information in real time as particular categories or selections are selected or deselected to show the memory requirements for the total selected download or a portion of the selections.

Additionally, more comprehensive and more concise/abbreviated versions of information may be selectable to meet the memory needs of the user. The user may also have the opportunity to select from textual, audio and/or video versions of the information to tailor the downloaded information to the space available. The information may remain static in the cell phone or device after download or installation, or may change periodically or in response to changes to the user's profile or automatically in response to changes in the user's location, etc. or based on known criteria such as the end of a sport's season. The information may be in addition to or in place of permanently storing information on the telephone or electronic device.

In a further embodiment, information may be provided about FAER topics that is education in nature, instead of directly applicable procedures. For instance, cross word puzzles with first aid terms or question and answer quizzes regarding first aid procedures could be provided to children's cell phones or electronic devices. Additionally, self-paced competency-based training could be provided to users that request such information or that are studying to become licensed EMTs, life guards, counselors or other such students or trainees. As federal agencies mandate post-Katrina implemented suggested training courses for public schools and other organizations and facilities, more officials will need access to emergency training and emergency information at the tip of their fingers.

One skilled in the art would appreciate that other reference material, health information, dictionaries, encyclopedias, etc., and other useful information could also be stored and provided or displayed as described herein.

It is to be understood that the present invention is not limited to the sole embodiment described above, but encompasses any and all embodiments within the scope of the following claims.

We claim:

1. A method of storing reference information on an electronic device, comprising:
   storing reference information embedded in the read only memory of the electronic device for later retrieval, where said information is selected from the group of emergency response information, first aid care, or emergency preparedness information;
   wherein further the electronic devices performs a check to determine whether a signal strength between the electronic device and a service provider for said electronic device is below a predetermined level and only unlocks at least a portion of said information when the signal strength is below the predetermined level.

2. The method of claim 1, wherein said electronic device is chosen from the group of cellular telephones, electronic phone, VOIP phone, POTS phone, PSTN phone, satellite phone, and PBX phone.

3. The method of claim 1, wherein said electronic device is chosen from the group of media player, personal data assistant, gaming device, portable computer, global positioning satellite displays, and laptop computer.

4. The method of claim 1, wherein said information is displayed on the electronic device in the form of audio, video, or text or a combination thereof.

5. The method of claim 1, wherein said information is provided as original equipment by a manufacturer of the electronic device prior to shipping the electronic device to a end user.

6. The method of claim 1, wherein said information is provided by a service provider of the electronic device prior to the service provider activating the electronic device for use by a subscriber.

7. A method of storing reference information on an electronic device, comprising:
   storing reference information embedded in the read only memory of the electronic device for later retrieval, where said information is selected from the group of emergency response information, first aid care, health information, or emergency preparedness information;
   wherein said information is locked and unavailable to the user until the user accepts a license to use the information.

8. A method of storing reference information on an electronic device, comprising:
   storing reference information embedded in the read only memory of the electronic device for later retrieval, where said information is selected from the group of emergency response information, first aid care, health information, or emergency preparedness information;
   wherein at least a portion of said information is locked until a communication with a remote party has been attempted.

9. A method of providing emergency and first aid information on a telephone handset for connecting over a network to a service provider, comprising:
   providing said telephone handset with at least one memory device and one display;
   storing the emergency and first aid information on said at least one memory device;
   wherein said emergency and first aid information can be recalled from memory and displayed on the display when said telephone handset is not actively connected to a service provider network; and
   wherein said information is locked and unavailable to the user prior to accepting a license to use the information.

10. A method of providing emergency and first aid information on a telephone handset for connecting over a network to a service provider, comprising:
    providing said telephone handset with at least one memory device and one display:
    storing the emergency and first aid information on said at least one memory device;
    wherein said emergency and first aid information can be recalled from memory and displayed on the display when said telephone handset is not actively connected to a service provider network; and
    wherein the electronic devices performs a check to determine whether a signal strength between the telephone handset and the service provider network for said telephone handset is below a predetermined level and only unlocks at least a portion of said information when the signal strength is below the predetermined level.

11. The method of claim 10, wherein said telephone handset is chosen from the group of cellular telephones, electronic phone, VOIP phone, POTS phone, PSTN phone, satellite phone, and PBX phone.

12. The method of claim 10, wherein said emergency and first aid information is displayed on the electronic device in the form of audio, video, or text or a combination thereof.

13. The method of claim 10, wherein said information is provided as original equipment by a manufacturer of the telephone handset prior to shipping the telephone handset to an end user.

14. The method of claim 10, wherein said information is provided by the service provider of the telephone handset prior to the service provider activating the telephone handset for use by a subscriber.

15. The method of claim 10, wherein said emergency and first aid information is embedded in read only memory of said telephone handset by one of said manufacturer and said service provider.

16. The method of claim 10, further comprising supplement said emergency and first aid information with supplemental information downloaded over a network and storing said information in RAM.

17. The method of claim 16, further comprising replacing at least a portion of said emergency and first aid information with said supplemental information when said emergency and first aid information is displayed on the display.

18. The method of claim 16, further comprising displaying both a portion of said supplemental information and a portion of said emergency and first aid information on the display.

* * * * *